June 13, 1939.  C. A. SHIPMAN  2,162,646
CLUTCH MECHANISM
Filed Sept. 16, 1937  2 Sheets-Sheet 1

Inventor
C. A. Shipman
By L. F. Kendrick
Attorney

June 13, 1939. C. A. SHIPMAN 2,162,646
CLUTCH MECHANISM
Filed Sept. 16, 1937 2 Sheets-Sheet 2
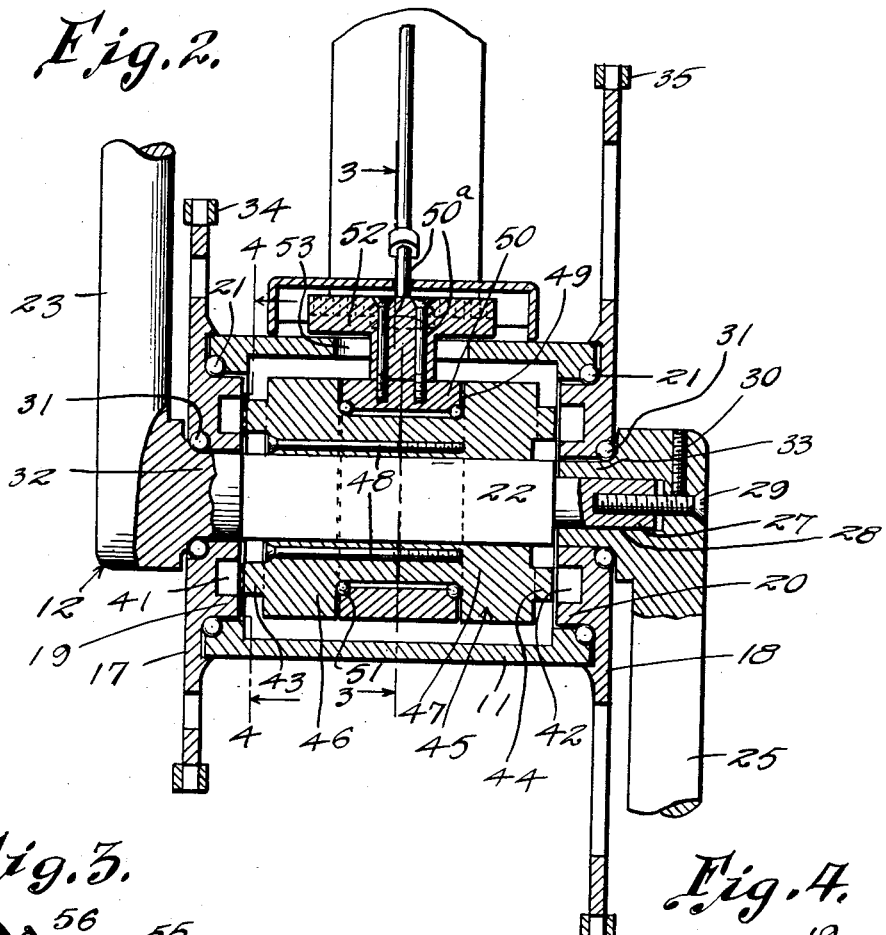
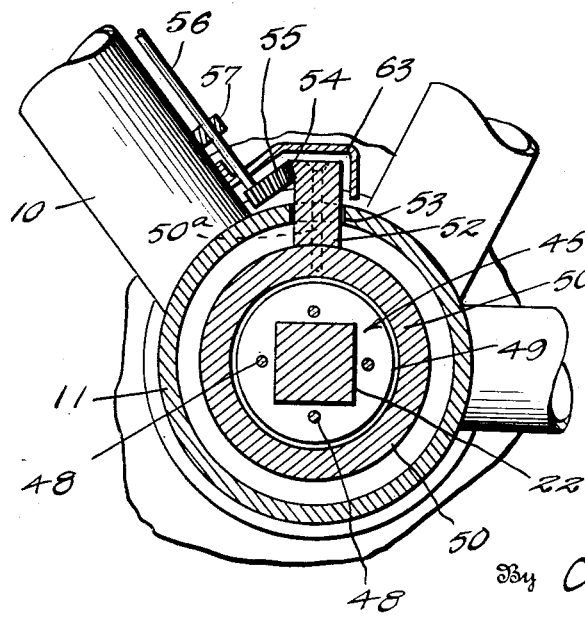
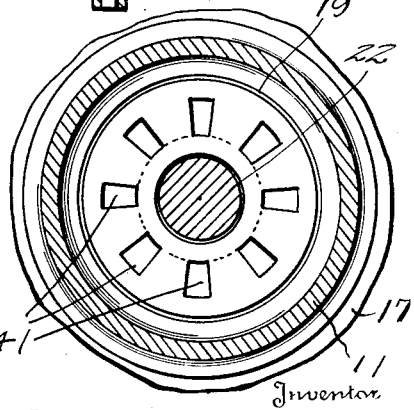
Inventor
C. A. Shipman Patented June 13, 1939

2,162,646

UNITED STATES PATENT OFFICE 2,162,646

CLUTCH MECHANISM

Clarence A. Shipman, Los Angeles, Calif.

Application September 16, 1937, Serial No. 164,241

2 Claims. (Cl. 192—82)

This invention relates to a clutch mechanism and it aims to provide a novel construction affording two speeds, that is a high and a low gear, the high gear being on the right or coaster brake side and the low gear being on the left side. Such a construction is especially advantageous in a bicycle in affording a low gear to enable the rider to ascend hills with ease, to permit a quicker get away.

The more specific objects and advantages will become apparent from a consideration of the description following taken in connection with accompanying drawings illustrating an operative embodiment.

In said drawings:—

Figure 2 is a transverse vertical sectional view through the transmission of such bicycle;

Figure 3 is a vertical section taken on the line 3—3 of Figure 2;

Figure 4 is a vertical section taken on the line 4—4 of Figure 2;

Figure 1:
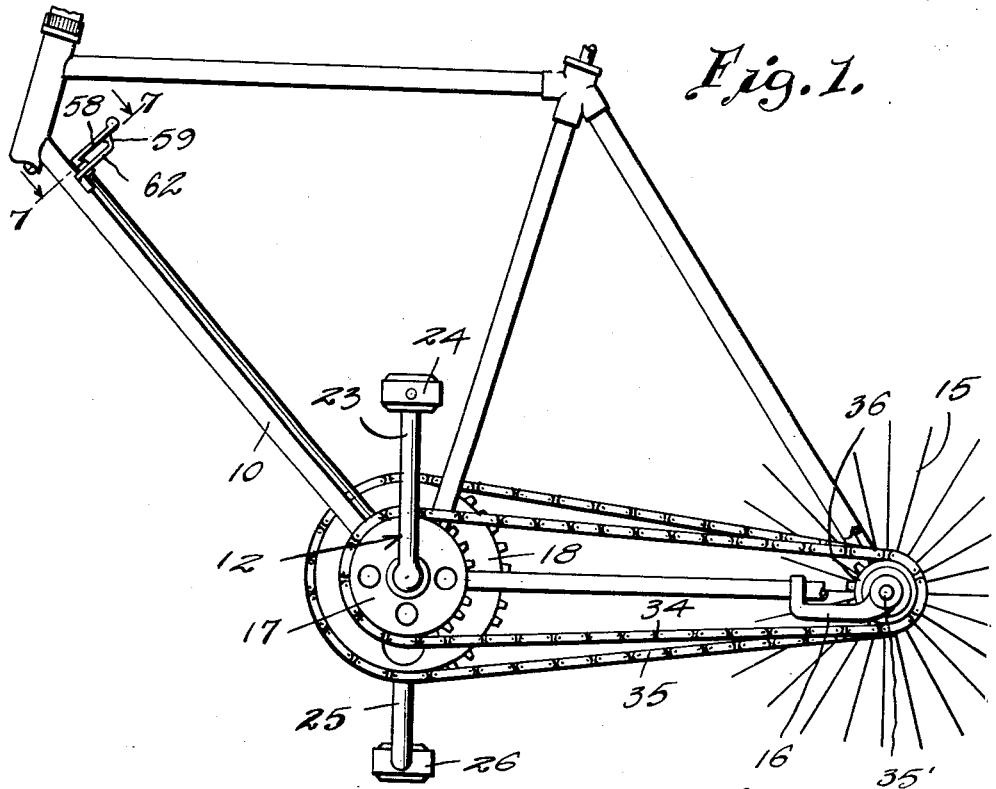
Figure 1 is a view in side elevation showing a bicycle equipped with my improvements.
Figure 5:
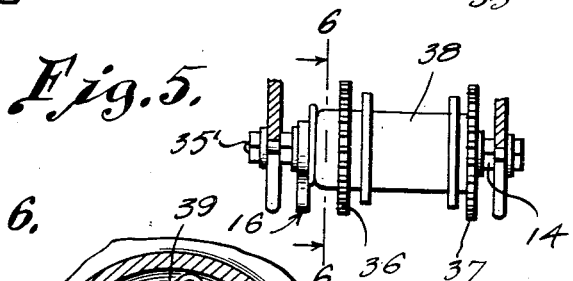
Figure 5 is a transverse section primarily showing the drive for the rear wheel of the bicycle.

Referring specifically to the drawings wherein like reference characters designate like or similar parts, the bicycle is provided with a suitable skeleton frame 10 having a hub 11 at the usual location for the crank mechanism generally designated 12, and having usual means at 14 for mounting the rear or drive wheel 15 and an associated coaster brake mechanism 16.

Sprocket wheels 17 and 18, of different diameters, to respectively afford low and high gears, are journaled at opposite ends of the hub 11. Said sprocket wheels have heads 19 and 20 extending interiorly of the hub and between the same and adjacent portions of the hub, ball bearings or equivalent anti-friction means are provided at 21.

The said crank means 12 comprises a crank shaft 22 which is square in cross section and from which a crank 23 extends which is equipped with a usual pedal 24. A crank arm 25 extends from the crank shaft 22 in the opposite direction to the crank arm 23 and it has a suitable pedal 26. Crank arm 25 is preferably detachably connected to the crank shaft 22 through the engagement of a square stud 27 on the crank shaft in a recess 28 of the crank arm 25, square in cross section. A screw 29 may be passed from the crank arm 25 into the stud 27 and a locking screw 30 to bind against the screw 29, is threaded in the crank arm 25. It will be noted that ball bearings 31 are interposed between the crank arms 23 and 25 and adjacent portions of the sprockets 17 and 18. Thus, while the shaft 22 is square in cross section, the arms 23 and 25 have journal portions 32 and 33, journaled in the sprockets 17 and 18, and directly engage with the ball bearings 31.

Figure 6:
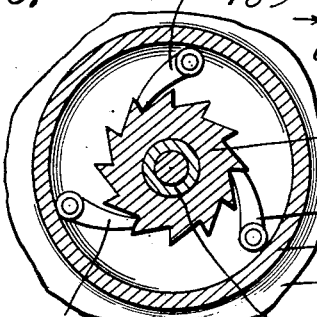
Figure 6 is a detail section taken on the line 6—6 of Figure 5.
Figure 7:
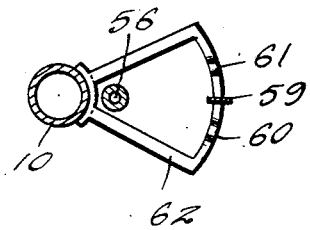
Figure 7 is a detail section taken on the line 7—7 of Figure 1.

Trained over the teeth of the sprocket wheels 17 and 18 are chains 34 and 35 respectively, which are also trained over sprocket wheels 36 and 37 on the hub 38 of the rear or drive wheel 15 of the bicycle. The chain 35 on the coaster brake side, will be unable to move the rear wheel in a retrograde direction and to prevent the chain 34 from moving the rear wheel in a retrograde direction, co-acting pawls 39 and a ratchet 40 are provided as in Figure 6.

The inner surfaces of the heads 19 and 20 have clutch recesses or sockets at 41 and 42 respectively, which are engageable by correspondingly shaped clutch projections or teeth 43 and 44, respectively, on opposite ends of a clutch head 45 slidable in opposite directions on the square portion 22 of the crank shaft, and having a square bore engaging such portion 22. The clutch head 45 is preferably made in two sections 46 and 47 detachably connected together by screws or the like 48.

Said clutch head has a peripheral central groove 49 occupied by a ring or collar 50, with ball bearings 51 interposed between the same and the clutch head.

Fastened to the ring 50 by means of screws 50ª are rack bar members 52 which extend through an elongated slot 53 in the hub 11.

Said rack bar sections 52 have teeth 54 engaged by a gear wheel 55. Gear wheel 55 is carried by a rockshaft 56 journaled in suitable bearings 57 and disposed parallel to one of the bars of the frame 10. Said shaft 56 has an operating arm or latch 58 thereon provided with a lug 59. Said arm 58 is somewhat flexible so that said lug may engage in depressions 60 and 61 of a bracket 62 fastened to the frame 10.

It will be noted that a bracket or enclosure 63 is connected to the frame and disposed over the gear members 52 and 55 and affords a bearing for the shaft 56.

When a low speed is desired, the rider moves the arm 58 to the left, thereby meshing the intermediate gearing, or more specifically sliding clutch head 46 to the left and engaging the teeth 43 in the recesses 41 and at the same time engaging the lug 59 in the recess 60, locking the parts in such position. Turning of the pedals will thereupon cause the sprocket 17 to rotate, imparting motion to the chain 34 and through the same to the rear wheel. When it is desired to use the high gear, arm 58 is moved to the right, disengaging the teeth 43 and 41 and engaging those at 44 and 42, thereby driving the gear or sprocket 18, shaft 35' and the rear wheel and locking the parts in such position through the engagement of the said lug 59 in recess 61.

Various changes may be resorted to provided they fall within the spirit and scope of the invention.

I claim as my invention:—

1. Apparatus of the class described having a cylindrical hub, rotatable parts interfitted with the hub at opposite ends and constituting closures therefor, means extending through the hub and said parts to prevent detachment of the latter, clutch portions on said rotatable parts on the inner faces thereof, and a clutch member slidable on said means having clutch portions at opposite ends to selectively engage the first mentioned clutch portions, a ring about the clutch member having a head extending therefrom, said hub having a slot through which the head passes, and operating means connected to said head.

2. Apparatus of the class described having a cylindrical hub, rotatable parts interfitted with the hub at opposite ends and constituting closures therefor, means extending through the hub and said parts to prevent detachment of the latter, clutch portions on said rotatable parts on the inner faces thereof, and a clutch member slidable on said means having clutch portions at opposite ends to selectively engage the first mentioned clutch portions, said hub at both ends being inwardly enlarged to form bearings for said rotatable parts, a ring about the clutch member having a head extending therefrom, said hub having a slot through which the head passes, operating means geared to the head, and a casing about the head and operating means.

CLARENCE A. SHIPMAN.